(12) United States Patent
Rodriguez et al.

(10) Patent No.: US 12,437,052 B2
(45) Date of Patent: Oct. 7, 2025

(54) PROVING MEMBERSHIP USING CRYPTOGRAPHIC IDENTITIES

(71) Applicant: Apple Inc., Cupertino, CA (US)

(72) Inventors: Alejandro A. Rodriguez, Saratoga, CA (US); Frederic Jacobs, St. Sulpice (CH); Stephen M. Lottermoser, San Jose, CA (US); Pierre J. De Filippis, Los Gatos, CA (US); Ryan A. Williams, Morgan Hill, CA (US); Yannick L. Sierra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 153 days.

(21) Appl. No.: 18/197,030

(22) Filed: May 12, 2023

(65) Prior Publication Data

US 2023/0394133 A1 Dec. 7, 2023

Related U.S. Application Data

(60) Provisional application No. 63/349,034, filed on Jun. 3, 2022.

(51) Int. Cl.
*G06F 21/44* (2013.01)
*G06F 21/31* (2013.01)

(52) U.S. Cl.
CPC .............. *G06F 21/44* (2013.01); *G06F 21/31* (2013.01); *G06F 2221/2141* (2013.01)

(58) Field of Classification Search
CPC ... G06F 21/44; G06F 21/31; G06F 2221/2141
See application file for complete search history.

(56) References Cited

U.S. PATENT DOCUMENTS

| | | | |
|---|---|---|---|
| 9,264,232 B2 * | 2/2016 | Wittenberg | H04L 9/32 |
| 9,313,239 B2 * | 4/2016 | Sekiguchi | H04L 65/403 |
| 9,635,000 B1 * | 4/2017 | Muftic | H04L 9/3239 |
| 10,325,084 B1 * | 6/2019 | Larimer | H04L 9/3297 |
| 11,601,402 B1 * | 3/2023 | Delaney | H04L 63/0823 |
| 2006/0050869 A1 * | 3/2006 | Tuvell | H04L 63/062 380/28 |
| 2016/0344561 A1 * | 11/2016 | Grajek | H04L 63/0884 |
| 2017/0104589 A1 * | 4/2017 | Lambert | H04L 9/3268 |
| 2018/0198627 A1 * | 7/2018 | Mullins | H04L 9/3066 |
| 2019/0103984 A1 * | 4/2019 | Yang | H04L 12/1818 |
| 2019/0280877 A1 * | 9/2019 | Isles | H04L 63/126 |

(Continued)

*Primary Examiner* — Jimmy H Tran
(74) *Attorney, Agent, or Firm* — BAKERHOSTETLER

(57) ABSTRACT

Aspects of the subject technology include obtaining, by a first device associated with a first user account, one or more item-specific public keys of one or more devices associated with a second user account and generating a data structure representing the one or more devices associated with the second user account based on the one or more item-specific public keys. Aspects may also include providing an identifier of the data structure to a server for association with the item and generating an invitation for the second user account to access the item. Aspects may further include providing the invitation to a second device of the one or more devices associated with the second user account to provide the second device with access to the item via the server based on at least a portion of the data structure and a respective item-specific public key of the second device.

21 Claims, 10 Drawing Sheets

(56) References Cited

U.S. PATENT DOCUMENTS

| | | | | |
|---|---|---|---|---|
| 2019/0312734 | A1* | 10/2019 | Wentz | H04L 9/3239 |
| 2019/0319932 | A1* | 10/2019 | Kandregula | H04L 67/306 |
| 2020/0052905 | A1* | 2/2020 | Mathias | H04L 9/3265 |
| 2020/0106774 | A1* | 4/2020 | Lerch | G07C 9/28 |
| 2020/0280855 | A1* | 9/2020 | Avetisov | H04L 63/20 |
| 2020/0313858 | A1* | 10/2020 | Feng | G06F 21/53 |
| 2021/0112407 | A1* | 4/2021 | Shin | H04L 63/0869 |
| 2021/0119764 | A1* | 4/2021 | Meghji | G06F 21/6218 |
| 2022/0173890 | A1* | 6/2022 | Momchilov | G06F 21/34 |
| 2022/0321359 | A1* | 10/2022 | Nosseir | H04L 9/3226 |
| 2022/0377280 | A1* | 11/2022 | Lyons | H04L 9/3247 |
| 2022/0400012 | A1* | 12/2022 | Tran | H04L 9/3231 |
| 2022/0417038 | A1* | 12/2022 | Kravitz | H04L 63/10 |
| 2023/0143579 | A1* | 5/2023 | Asgekar | H04L 12/1822 348/14.09 |
| 2023/0216947 | A1* | 7/2023 | Bernardi | H04L 67/10 713/150 |
| 2023/0281604 | A1* | 9/2023 | Robell | G06Q 30/018 |
| 2024/0144161 | A1* | 5/2024 | Gillen | G06Q 10/0833 |
| 2024/0163081 | A1* | 5/2024 | Bosworth | H04L 63/065 |

\* cited by examiner

PROVING MEMBERSHIP USING CRYPTOGRAPHIC IDENTITIES

CROSS-REFERENCE TO RELATED APPLICATIONS

The present application claims the benefit of U.S. Provisional Patent Application Ser. No. 63/349,034, entitled "PROVING MEMBERSHIP USING CRYPTOGRAPHIC IDENTITIES," filed Jun. 3, 2022, which is hereby incorporated herein by reference in its entirety and made part of the present U.S. Utility Patent Application for all purposes.

TECHNICAL FIELD

The present description generally relates to group communications on electronic devices and, more particularly, to proving membership using cryptographic identities.

BACKGROUND

An electronic device such as a laptop, tablet, or smartphone, may be configured to participate in group communication sessions. Document collaboration sessions, for example, allow people in remote locations to view and/or modify a document with each other in real-time.

BRIEF DESCRIPTION OF THE DRAWINGS

Certain features of the subject technology are set forth in the appended claims. However, for the purpose of explanation, several implementations of the subject technology are set forth in the following figures.

DETAILED DESCRIPTION

Figure 1:
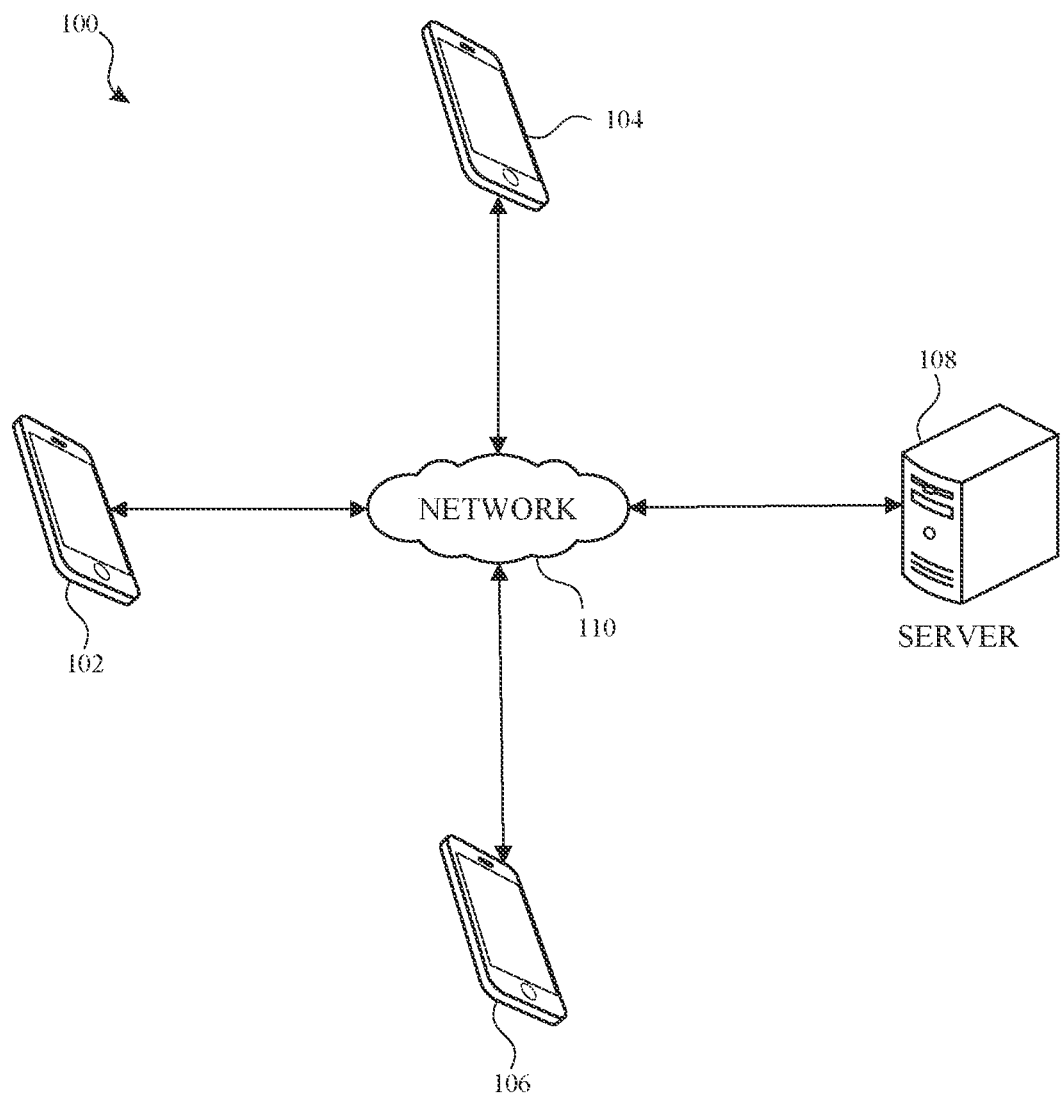
FIG. 1 illustrates an example network environment for group communication sessions in which participating devices may be invited to share an item, in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Users participating in a group communication session with an electronic device may invite other users to access items with their participating electronic device. In one or more implementations, a user may initiate a group communication session to invite one or more other users to access items with their participating electronic devices. Access may include, for example, collaborating, sharing, distributing, or any other interaction with an item. Items may include, for example, documents, multimedia projects, or any other digital file, such as a digital file that may be hosted by a third party. Electronic devices may be configured to engage in group communication sessions (e.g., video calls, audio calls, message threads including text messages, and/or the like) with one or more other similarly configured electronic devices. Electronic devices in a group communication session may send and receive data between each other, including invitations to access an item.

In one or more implementations, users may desire to communicate information regarding an item (e.g., including sending invitations to access the item) within a group communication session in which the users are identified and contacted using group communication identifiers (e.g., phone numbers or email addresses), without exposing those group communication identifiers to another application and/or associated server that is used for collaborating on the item. Aspects of the subject technology may provide the advantage of allowing a user to invite other users to access an item via a group communication session without exposing group communication session information (e.g., including identifiers) to the application that is used to access the item.

Users of the electronic devices participating in a communication session may have access to other electronic devices (e.g., smartphone, laptop, tablet, and/or the like) that may or may not be participating in the group communication session. For example, multiple electronic devices of the user may be registered to the same user account, such as with a server associated with the group communication session. It may be desirable for the user to be able to access the collaborative item using any of their electronic devices. Accordingly, another example advantage that may be provided by the subject technology is the use of device keys to offer a concept of a user identity without exposing a list of a user's devices to an application. This way, a device can be verified as being associated with the user in a cryptographic manner that is independently verifiable (i.e., verifiable without having to confirm with another device or with the server associated with the group communication session) without revealing potentially private information, such as the number of devices the user has and/or the group communication identifier(s) used to exchange information within the group communication session.

FIG. 1 illustrates an example network environment 100 for group communication sessions in which participating devices may be invited to share an item, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 may include an electronic device 102, an electronic device 104, an electronic device 106, and one or more servers (e.g., a server 108). The network 110 may communicatively (directly or indirectly) couple the electronic device 102, the electronic device 104, the electronic device 106, and the server 108. In one or more implementations, the network 110 may be an interconnected network of devices that may include, or may be communicatively coupled to, the Internet. For explanatory purposes, the network environment 100 is illustrated in FIG. 1 as including the electronic device 102, the electronic device 104, the electronic device 106, and the server 108; however, the network environment 100 may include any number of electronic devices and/or any number of servers communicatively coupled to each other directly or via the network 110.

The electronic device 102 may be, for example, a desktop computer, a portable computing device such as a laptop computer, a smartphone, a peripheral device (e.g., a digital camera, headphones), a tablet device, standalone videoconferencing hardware, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 102 may include a conferencing module (and/or circuitry) and one or more applications. In FIG. 1, by way of example, the electronic device 102 is depicted as a smartphone. The electronic device 102 may be, and/or may include all or part of, the electronic system discussed below with respect to FIG. 10. In one or more implementations, the electronic device 102 may include a camera and a microphone and may provide the conferencing module or application for obtaining and/or exchanging user communications data such as audio streams and/or video streams over the network 110, such as with a corresponding conferencing module or application that is installed and accessible at, for example, electronic device 104, and/or electronic device 106. The electronic device 102 may be a participant in a group communication session with the electronic device 104 and/or the electronic device 106, wherein data may be exchanged synchronously and/or asynchronously.

The electronic device 104 may be, for example, a portable computing device such as a laptop computer, a smartphone, a peripheral device (e.g., a digital camera, headphones), a tablet device, a wearable device such as a watch, a band, and the like, any other appropriate device that includes, for example, one or more wireless interfaces, such as WLAN radios, cellular radios, Bluetooth radios, Zigbee radios, NFC radios, and/or other wireless radios. In one or more implementations, the electronic device 104 may include a conferencing module and one or more applications. In FIG. 1, by way of example, the electronic device 104 is depicted as a smartphone. The electronic device 104 may be, and/or may include all or part of, the electronic system discussed below with respect to FIG. 10. In one or more implementations, the electronic device 104 may include a camera and a microphone and may provide the conferencing module for obtaining and/or exchanging user communications data such as audio streams and/or video streams over the network 110, such as with a corresponding conferencing module that is installed and accessible at, for example, electronic device 102, electronic device 104, and/or electronic device 106. The electronic device 104 may be in a location that is nearby the electronic device 102 for directly sending and/or receiving messages with electronic device 102, such as Bluetooth messages or other near field communications. The electronic device 104 may be a participant in a group communication session with the electronic device 102 and/or the electronic device 106, wherein data may be exchanged synchronously and/or asynchronously.

The electronic device 106 may be, for example, a portable computing device such as a laptop computer, a smartphone, a peripheral device (e.g., a digital camera, headphones), a tablet device, a wearable device such as a watch, a band, and the like, any other appropriate device that includes, for example, one or more wireless interfaces, such as WLAN radios, cellular radios, Bluetooth radios, Zigbee radios, NFC radios, and/or other wireless radios. In one or more implementations, the electronic device 106 may include a conferencing module and one or more applications. In FIG. 1, by way of example, the electronic device 106 is depicted as a smartphone. The electronic device 106 may be, and/or may include all or part of, the electronic system discussed below with respect to FIG. 10. In one or more implementations, the electronic device 106 may include a camera and a microphone and may provide the conferencing module or application for obtaining and/or exchanging user communications data such as audio streams and/or video streams over the network 110. The electronic device 106 may be a participant in a group communication session with the electronic device 102 and/or the electronic device 104, wherein data may be exchanged synchronously and/or asynchronously.

In one or more implementations, one or more servers (e.g., the server 108) may perform operations for managing the secure exchange of user communications data and/or communication sessions data between various electronic devices (e.g., the electronic device 102, the electronic device 104, and/or the electronic device 106), such as during a group communication session (e.g., an audio conferencing session, a video conferencing session, a text messaging session). In some variations, the server 108 is a relay server (e.g., a quick relay server). In some variations, the server 108 includes one or more app-specific modules (e.g., plugins) that perform operations for a respective application (e.g., a video conferencing application). In some variations, the server 108 includes one or more push modules for providing asynchronous notifications to one or more electronic devices (e.g., publish-subscribe messaging).

In one or more implementations, the server 108 may store account information (e.g., account, handles, or any other account-specific data) associated with the electronic device 102, the electronic device 104, the electronic device 106, and/or users thereof and/or users associated therewith. In one or more implementations, one or more servers (e.g., the server 108) may provide content (e.g., media content, application content, or any other suitable data) that is to be processed at a participant device (e.g., the electronic device 102 and/or the electronic device 104) by an application or operating system of the participant device. In one or more implementations, although a single server 108 is depicted in FIG. 1, the network environment 100 may include one or more first servers that manage communications for a group communication session for the electronic device 102, the electronic device 104, and/or the electronic device 106, and/or one or more second servers that manage collaboration on an item such as a document. In one or more implementations, each of the electronic device 102, the electronic device 104, and/or the electronic device 106 may be registered to a respective first account with the one or more first servers. In one or more implementations, users of one or more of the electronic device 102, the electronic device 104, and/or the electronic device 106 may also have a separate respective second account with the one or more second servers for collaborating on a document. In one or more implementations, first user identifiers, such as email addresses, telephone numbers, usernames, and the like, may be different for the first accounts with the one or more first servers than second identifiers used for the second accounts with the one or more second servers. In one or more implementations, the one or more first servers may be provided by a first provider, the one or more second servers may be provided by a second provider (e.g., a provider different than the first provider), and the one or more first servers may not be in communication with the one or more second servers. Aspects of the subject technology may allow communications, using the first identifiers via the one or more first servers, to invite participants to access an item managed by the one or more second servers, without allowing the one or more second servers access to the first identifiers.

Figure 2:
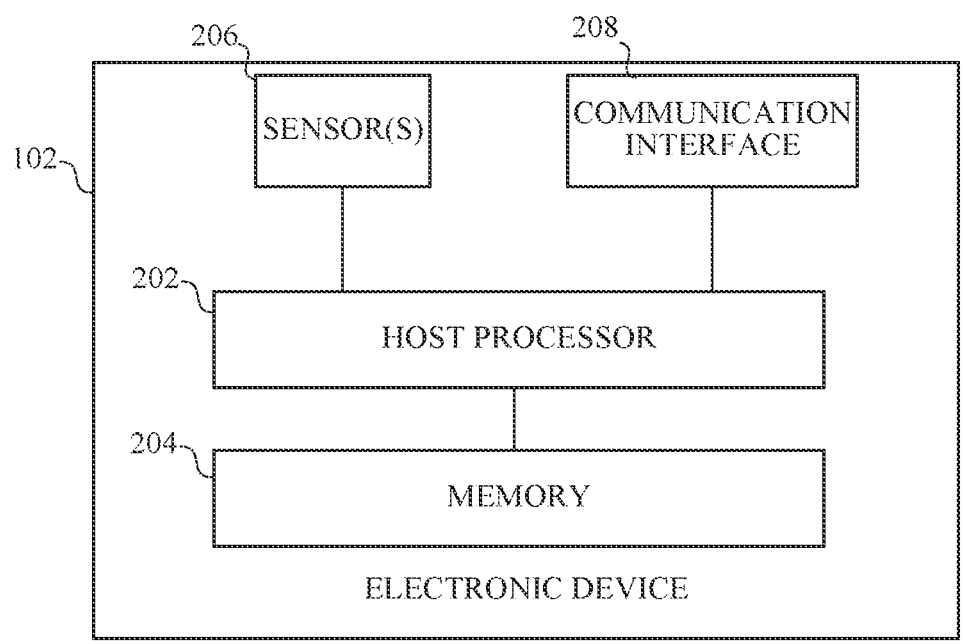
FIG. 2 depicts an example electronic device that may implement the subject methods and systems, in accordance with one or more implementations.

FIG. 2 depicts an electronic device 102 that may implement the subject methods and systems, in accordance with one or more implementations. For explanatory purposes, FIG. 2 is primarily described herein with reference to the electronic device 102 of FIG. 1. However, this is merely illustrative, and features of the electronic device of FIG. 2 may be implemented in any of the electronic device 104, the electronic device 106, and/or any other electronic device for implementing the subject technology. Not all of the depicted components may be used in all implementations, however, and one or more implementations may include additional or different components than those shown in FIG. 2. Variations in the arrangement and type of the components may be made without departing from the spirit or scope of the claims as set forth herein. Additional components, different components, or fewer components may be provided.

The electronic device 102 may include one or more of a host processor 202, a memory 204, one or more sensor(s) 206, and/or a communication interface 208. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. The host processor 202 may further implement an operating system or may otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. In one or more implementations, the memory 204 may store communication session data (e.g., as provided by the server 108) for participating in communication sessions with other electronic devices. The memory 204 may further store account information and any other type of identifier that associates the electronic device 102 with its corresponding user account and/or group communication sessions.

The sensor(s) 206 may include one or more microphones and/or cameras. The microphones may be used to facilitate the audio features of a communication session. For example, the microphones may obtain audio signals corresponding to the voice of a participant in a communication session. The cameras may be used to facilitate the video features of a communication session. For example, the cameras may obtain images of the face of a participant in a communication session.

The communication interface 208 may include suitable logic, circuitry, and/or code that enables wired or wireless communication, such as between the electronic device 102 and the server 108. The communication interface 208 may include, for example, one or more of a Bluetooth communication interface, an NFC interface, a Zigbee communication interface, a WLAN communication interface, a USB communication interface, a cellular interface, or generally any communication interface.

In one or more implementations, one or more of the host processor 202, the memory 204, the sensor(s) 206, the communication interface 208, and/or one or more portions thereof may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
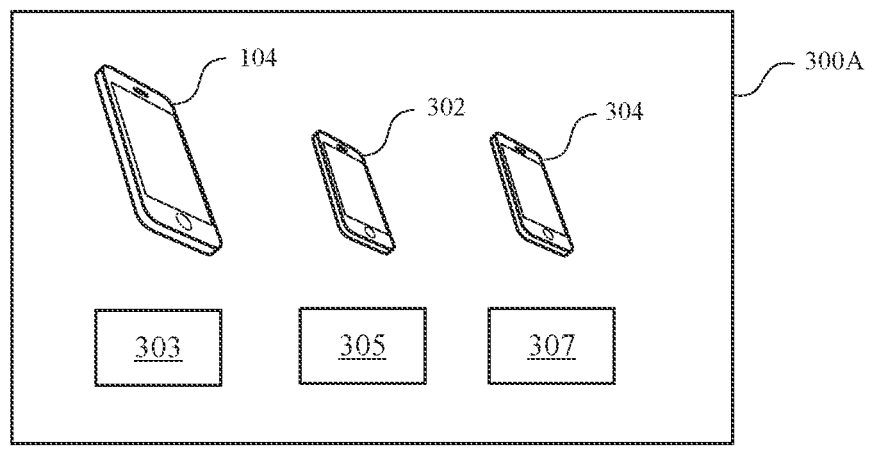
FIG. 3 depicts devices that are associated with the devices participating in a group communication session, in accordance with one or more implementations.
Figure 3:
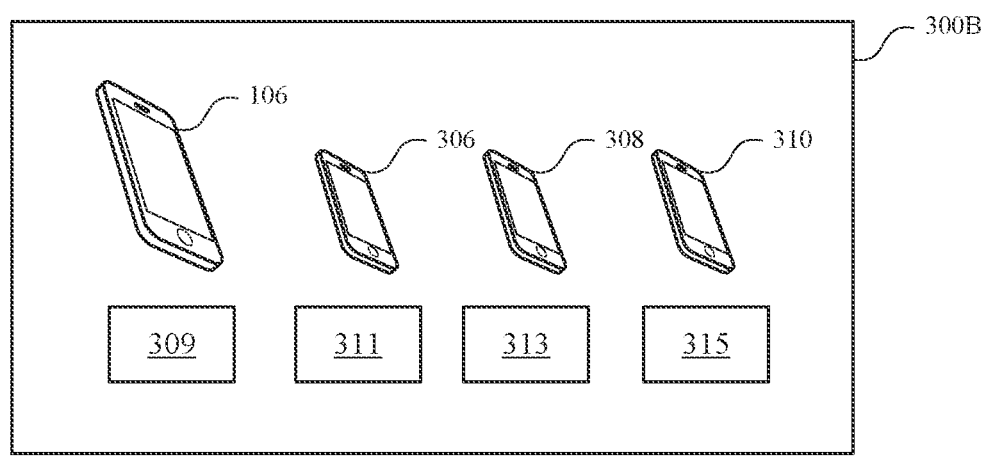

FIG. 3 depicts an example of devices that are associated with the same user account (e.g., a first association 300A and a second association 300B), in accordance with one or more implementations. The electronic device 104 and the electronic device 106 may be the devices described in reference to FIG. 1. It is thus contemplated that the electronic device 104 and the electronic device 106 may be any electronic device configured to engage in communication sessions with each other and/or with the electronic device 102, such as video communication sessions, audio communication sessions, group messaging sessions, phone calls, and/or the like.

As previously described, the electronic device 102, electronic device 104, and electronic device 106 may be in a group communication session with each other or the electronic device 102, the electronic device 104, and/or the electronic device 106 may be used to initiate a group communication session with others of the electronic device 102, the electronic device 104, and/or the electronic device 106, although some implementations may include more or less than three devices. In one or more implementations, one or more of the electronic devices may be associated with other electronic devices. Associations may occur, for example, by registration under the same user account.

As shown in FIG. 3, a first association 300A may correspond to a user account having three registered devices: the electronic device 104, the electronic device 302, and the electronic device 304. A second association 300B may correspond to a user account having four registered devices: the electronic device 106, the electronic device 306, the electronic device 308, and the electronic device 310. Each electronic device may have a set of identifiers such as account identifiers, group communication identifiers, group communication session participant identifiers, private keys, public keys, and/or any other identifier that is attributable to at least one electronic device. Accordingly, the electronic device 104, the electronic device 302, the electronic device 304, the electronic device 106, the electronic device 306, the electronic device 308, and the electronic device 310 may have at least a public key 303, a public key 305, a public key 307, a public key 309, a public key 311, a public key 313, and a public key 315, respectively. The public keys 303-315 may be device-specific public keys. In one or more implementations, the public keys 303-315 may be other data, such as item-specific public keys or random data blobs, to better prevent tracking.

Figure 4:
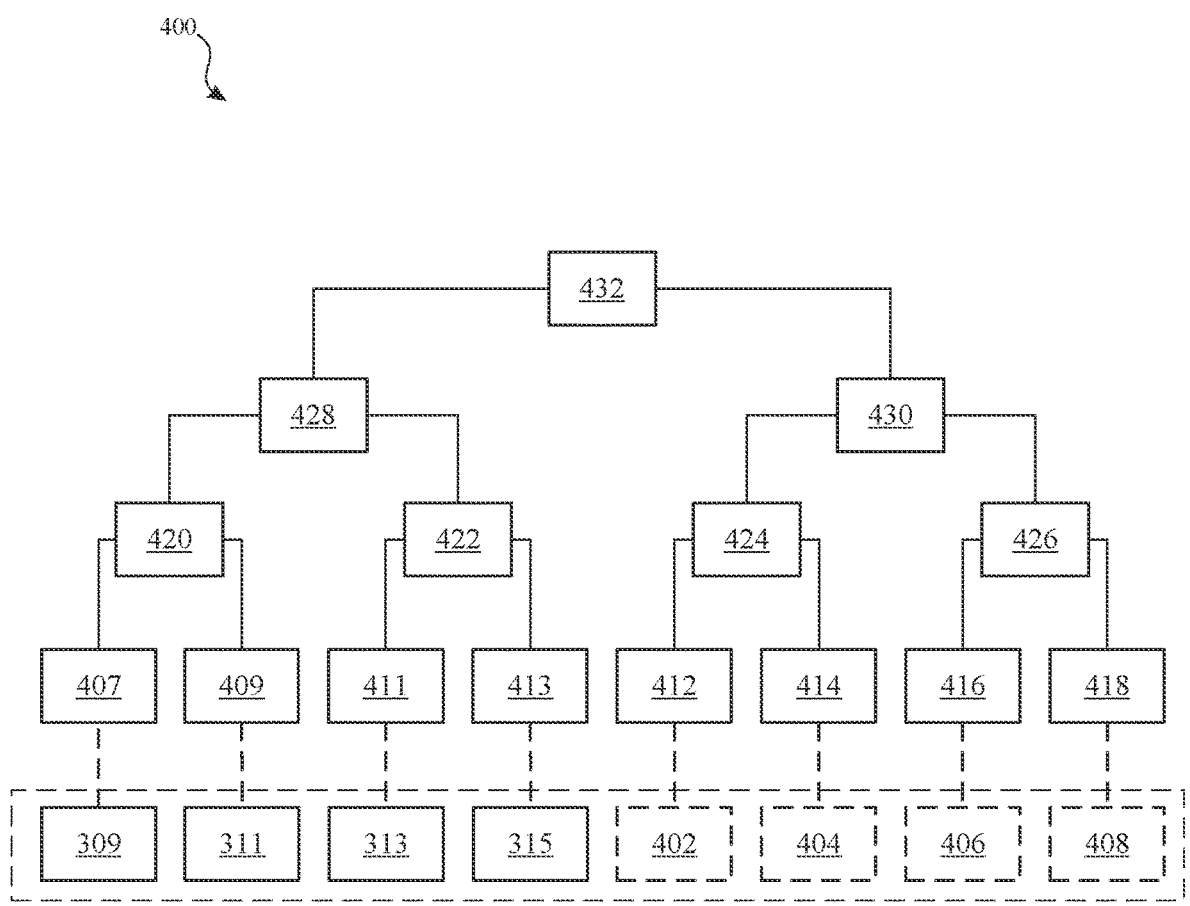
FIG. 4 depicts a tree data structure corresponding to a user account, in accordance with one or more implementations.

FIG. 4 depicts a data structure 400 corresponding to a user account, in accordance with one or more implementations. The user account may be, for example, a user account associated with a group communications server (e.g., a messaging server) that manages communications within a group communication session (e.g., a group text message). For explanatory purposes, the data structure 400 is primarily described herein with reference to the electronic device 106 shown and described with regard to FIGS. 1 and 3 and the second association 300B shown and described with regard to FIG. 3. However, it should be understood that any association containing a plurality of identifiers may generate a data structure similar to the data structure 400.

As shown in FIG. 4, the data structure 400 is a tree data structure, which may be implemented as a hash tree. The data structure 400 preserves user privacy by preventing (e.g., third-party) applications and/or servers (e.g., applications and/or servers that manage collaborative access to items such as documents) from accessing user identifiers, device identifiers, and/or devices on which a user has not accepted an invitation, as well as preventing (e.g., third-party) applications from determining how many devices are associated with a particular user account. Despite its privacy-preserving characteristics, the data structure 400 allows (e.g., third-party) applications to determine whether a device is authorized to access an item without providing user-account-level keys or user-account-level identifiers to the application. In other implementations, the data structure 400 may be any data structure that can derive a single identifier from one or more identifiers, such as a Rivest-Shamir-Adleman (RSA) accumulator. It should be understood that components of a tree data structure may be referred to as nodes (e.g., leaf node or root node), which may contain hashes (e.g., device-specific public key, item-specific public key, and/or other cryptographic identifiers).

The data structure 400 represents the devices associated with the second association 300B (e.g., a user account) and may be generated by, for example, the electronic device 102 and/or electronic device 104 for inviting the devices of the second association 300B to access an item such as a document. Generating the data structure 400 may include gathering the public key for each device of the user account (e.g., the second association 300B), such as public keys 309-315. The public keys may be stored in leaf nodes of the data structure 400. In one or more implementations, the public keys may be hashed before storing in leaf nodes of the data structure 400. In one or more implementations, if the number of the leaf nodes is less than a predetermined number of leaf nodes, generating the data structure 400 may also include generating placeholder (e.g., random) keys 402-408 such that the data structure 400 has a predetermined number of leaf nodes and will be a constant size for each user account (e.g., to increase privacy by obscuring the number of devices associated with the data structure 400).

In one or more implementations, the public keys 309-315 and, if applicable, the placeholder keys 402-408 may be item-specific public keys that are specific to the item corresponding to the invitation. In such implementations, the item-specific public keys may be generated based on item information (e.g., an item identifier) and device-specific public keys of the devices of the association 300B. Generating item-specific public keys may include processing a key such that the output is unique to the item and the key may be derivable from both the output of the processing and the item information (e.g., item identifier). Such processing includes, but is not limited to, key diversification. In one or more implementations, the public keys 309-315 may be omitted from the data structure 400 and nodes 407-418 having hashes (e.g., corresponding to the public keys 309-315 and/or placeholder keys 402-408) may be the leaf nodes of the data structure 400.

Once the leaf nodes are established (e.g., the public keys 309-315 and, if applicable, placeholder keys 402-408, or nodes 407-418), the rest of the data structure 400 may be generated. Generating the data structure 400 may include, for each sequential pair of nodes at each level n, generating a corresponding parent node at each level n−1 until the root level is reached (e.g., level 0). Generating a parent node may include deriving a hash from the hashes (e.g., keys) associated with the corresponding child nodes. Deriving a hash from the hashes (e.g., keys) associated with the corresponding child nodes may include concatenating the hashes (e.g., keys) of the corresponding child nodes (e.g., and re-hashing the concatenated hashes) to create a single hash, and/or performing any other predetermined function on the hashes. The hash stored in the root node 432 of the data structure 400 may represent the identity of the user associated with the data structure 400 (e.g., the second association 300B).

For example, the nodes 407-418 are leaf nodes at level 3 of the data structure 400. For each pair of nodes 407-418 (e.g., nodes 407 and 409, nodes 411 and 413, nodes 412 and 414, and nodes 416 and 418), a corresponding parent node at level 2 of the data structure 400 may be generated (e.g., node 420, node 422, node 424, and node 426). For each pair of nodes at level 2, a corresponding parent node at level 1 of the data structure 400 may be generated (e.g., node 428 and node 430). For each pair of nodes at level 1, a corresponding parent node at level 0 of the data structure 400 may be generated (e.g., root node 432). The hash stored at the root node 432 may represent the identity of the user corresponding to the data structure 400.

Figure 5:
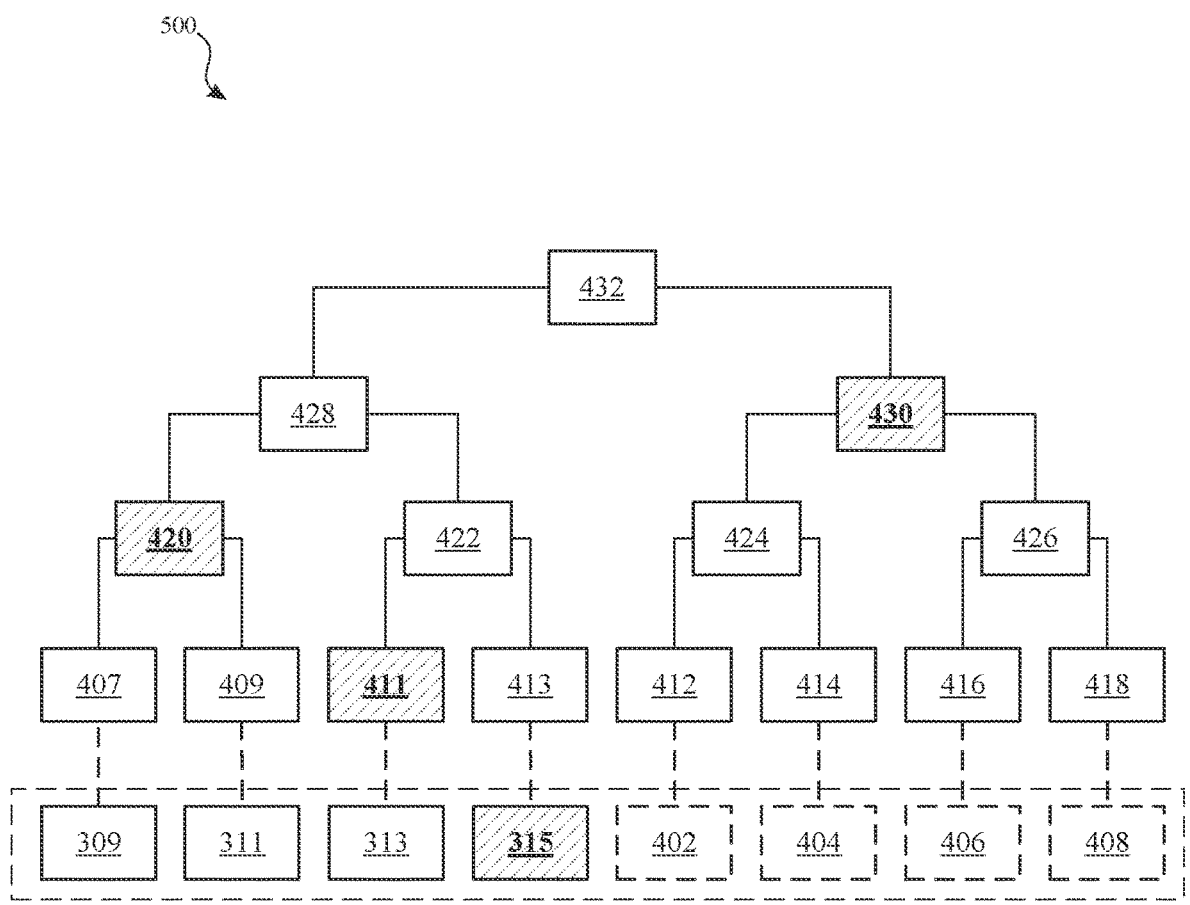
FIG. 5 depicts the generation of a proof of authorization based on at least a portion of the tree data structure of FIG. 4, in accordance with one or more implementations.

FIG. 5 depicts the generation of a proof of authorization 500 based on at least a portion of the tree data structure of FIG. 4, in accordance with one or more implementations. It should be understood that components of a tree data structure (e.g., the data structure 400) may be referred to using tree data structure component terms (e.g., node, leaf node, or root node) and/or by their contents (e.g., public key or hash). The device attempting to access an item may receive a data structure 400 (such as from another device providing access to a collaborative item such as a document) or a portion thereof for generating a proof of authorization 500. The proof of authorization 500 may include at least a portion of the data structure 400 and a public key 315 (e.g., the item-specific public key of the device generating the proof of authorization). Particularly, the proof of authorization 500 may include each node that is a child of the root node 432 and is not an ancestor of the leaf node corresponding to the public key of the electronic device 310 (e.g., node 420 and node 430), as well as the public key 315 of the device generating the proof of authorization, and a sibling node (e.g., node 411) of the node corresponding to the device generating the proof of authorization. The proof of authorization 500 allows for the root node 432 of the data structure 400 to be derived from only a portion of the data structure 400 including the public key 315 (e.g., the item-specific public key) of the electronic device 310. For example, a collaborative system or device that received the root node 432 from another source (e.g., a user sharing a collaborative item) can derive the root node 432 from the proof of authorization 500 to verify that the device providing the proof of authorization is authorized to access the collaborative item. In one or more embodiments, the public key 315 may also or instead be a corresponding item-specific public key.

For example, FIG. 5 illustrates the proof of authorization 500 includes public key 315, node 411, node 420, and node 430 within the data structure 400, for explanatory purposes. A server or system (e.g., a collaborative system) that maintains access to an item may have a list of cryptographic identifiers (e.g., root nodes, such as root node 432) that correspond to user accounts and/or devices that may access the item. When the electronic device 310 attempts to access the item, the server 108 may receive from the electronic device 310 a proof of authorization 500, including the public key 315, node 411, node 420, and node 430. With the proof of authorization 500, the server 108 may derive the root node 432 of the tree data structure 400. The server 108 may authorize the device (e.g., the electronic device 310) that sent the proof of authorization 500 to access the item if the derived root node 432 is included in the list of cryptographic identifiers that may access the item. For example, the cryptographic identifier may be included in the list of cryptographic identifiers at the server when the device that initially generated the data structure 400 provided the cryptographic identifier (e.g., root node 432) to an application associated with the server at that device, and the application associated with the server at that device provided the cryptographic identifier to the server for storage in the list of cryptographic identifiers.

Figure 6:
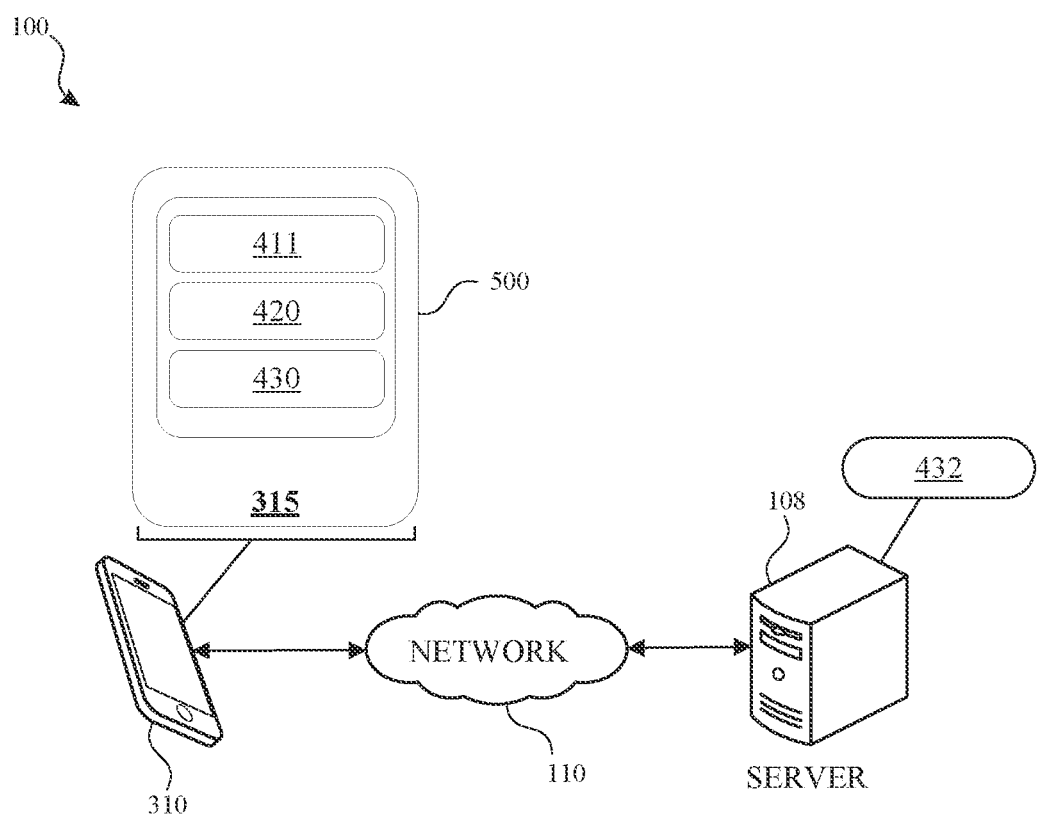
FIG. 6 depicts the network environment of FIG. 1 in which an invitee provides a proof of authorization to access the item to a server, in accordance with one or more implementations.

FIG. 6 depicts the network environment 100 of FIG. 1 in which an electronic device 310 provides a proof of authorization 500 to access the item to a server 108, in accordance with one or more implementations. The proof of authorization 500 may include the hashes corresponding to the node 411, the node 420, and the node 430 as well as the public key 315 (e.g., the item-specific public key) of the electronic device 310. In one or more implementations, the proof of authorization 500 may also include a signature generated using a private key of the electronic device 310. After generating the proof of authorization 500, the electronic device 310 may provide the proof of authorization 500 to the server 108. The electronic device 310 may provide the proof of authorization 500 to the server 108 directly or indirectly via any data transportation medium, such as the network 110. In one or more implementations, an application associated with the item may provide the proof of authorization 500 to the server associated with that application.

After the server 108 receives the proof of authorization 500, the server 108 may derive a root node based on the proof of authorization 500. Deriving the root node may include recreating at least a portion of the data structure 400 based on the received proof of authorization 500. For example, the server 108 may derive the ancestor of the leaf node associated with the electronic device 310 (e.g., node 428) based on the public key 315, the node 411, and the node 420, and derive the root node 432 based on the nodes that are children of the root node (e.g., node 428 and node 430). After recreating the root node 432, the server 108 may determine whether the root node 432 is included in a list of cryptographic identifiers permitted to access the item. If the root node 432 is included in the list of cryptographic identifiers permitted to access the item, the server 108 may allow the electronic device 310 to access the item.

In one or more implementations, the server 108 may also verify the integrity of the proof of authorization 500 by verifying the signature accompanying the proof of authorization 500. For example, the server 108 may use the public key of the electronic device 310 (e.g., which may be and/or may be derived from the public key 315 or obtained separately but verified to be associated with the electronic device 310 and/or the public key 315) to derive a hash of the data of the proof of authorization 500 from the signature, generate a hash of the data of the proof of authorization 500, and compare the derived hash and the generated hash to ensure they match.

In one or more implementations, the server 108 may request that the electronic device 310 that generated the proof of authorization 500 to prove that it is the owner of the private key associated with the public key 315. For example, the server 108 may request that the electronic device 310 to sign a challenge (e.g., random data) to prove its identity. In response, the electronic device 310 may sign the challenge with its private key, and the server 108 may verify the signature with the public key 315.

Figure 7:
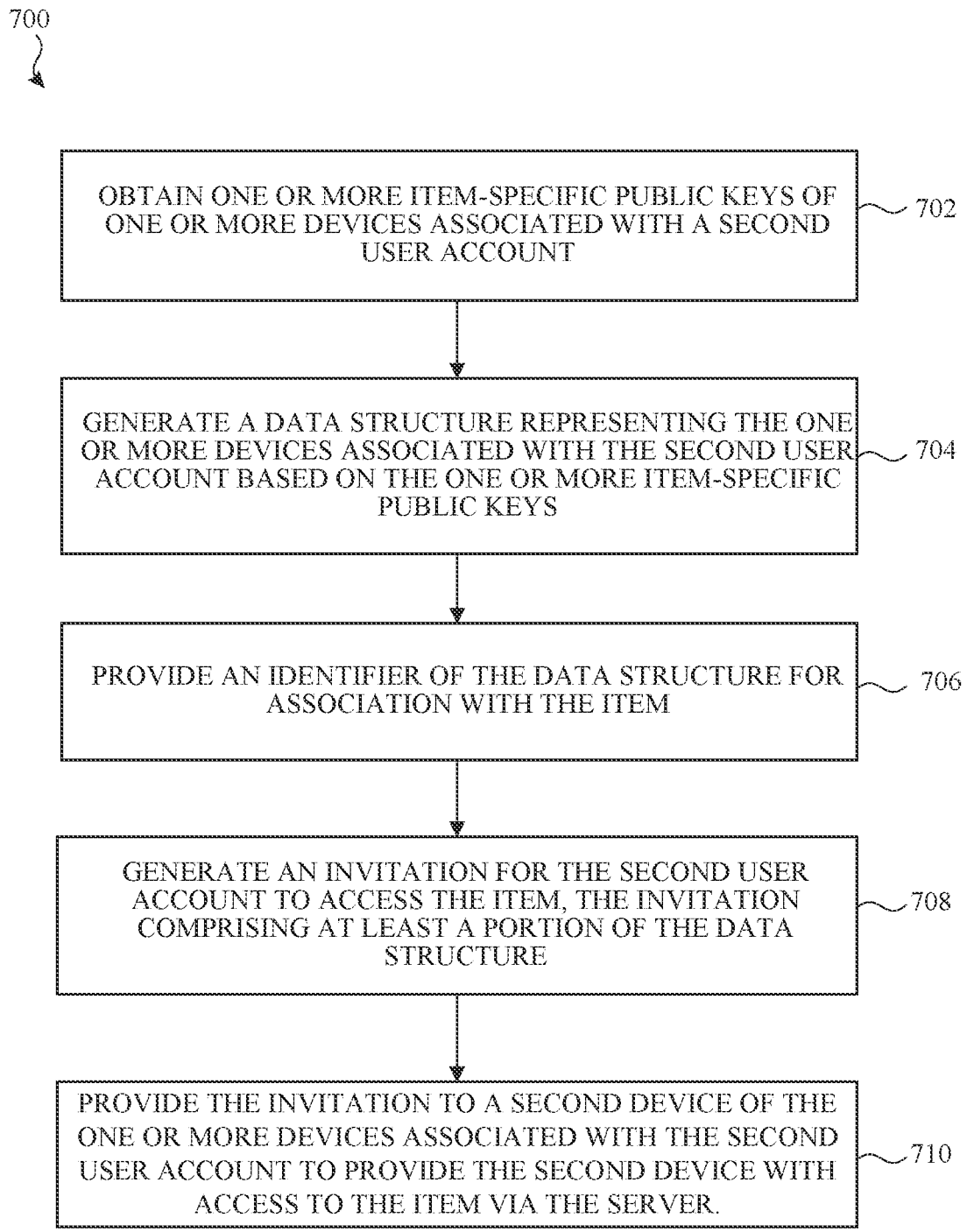
FIG. 7 depicts a flow diagram of an example process for sharing an invitation to participate in a group communication session, in accordance with one or more implementations.

FIG. 7 depicts a flow diagram of a process 700 for sharing an invitation to participate in a group communication session, in accordance with one or more implementations. For explanatory purposes, the process 700 is primarily described herein with reference to the electronic device 102, the electronic device 104, the electronic device 106, and the server 108 of FIG. 1. However, the process 700 is not limited to the electronic device 102, the electronic device 104, the electronic device 106, and/or the server 108, and one or more blocks of the process 700 may be performed by one or more other components of the electronic device 102, and/or by other suitable devices. Further, for explanatory purposes, the blocks of the process 700 are described herein as occurring sequentially or linearly. However, multiple blocks of the process 700 may occur in parallel. In addition, the blocks of the process 700 need not be performed in the order shown and/or one or more blocks of the process 700 need not be performed and/or can be replaced by other operations. It should be understood that components of a tree data structure (e.g., the data structure 400) may be referred to using tree data structure component terms (e.g., node, leaf node, or root node) and/or by their contents (e.g., public key or hash). In one or more implementations, an application stored on a first device performs the process 700 by calling APIs provided by the operating system of the first device. In one or more implementations, the operating system of the first device performs the process 700 by processing API calls provided by the application stored on the first device. In one or more implementations, the application stored on the first device fully performs the process 700 without making any API calls to the operating system of the first device.

At block 702, one or more public keys (e.g., public keys 309-315) are obtained. A first device (e.g., the electronic device 102) associated with a first user account may obtain the public keys corresponding to one or more devices (e.g., the electronic device 104 and the electronic device 106) associated with other user accounts, such as directly from the other devices and/or from a key management system/ server. The first user account and the other user accounts may each be participating in, or about to participate in, the same group communication session. The invitation may be from the first user account to the other user accounts to share a collaborative document.

In one or more implementations, the public keys may be item-specific public keys. To obtain the item-specific public key for each device, the first device may obtain (e.g., item-independent) device-specific public keys for each device associated with the one or more devices associated with the other user accounts. For example, the electronic device 106 is associated with the electronic device 306, the electronic device 308, and the electronic device 310 via the second association 300B (e.g., a user account) so the first device may obtain device-specific public keys of the electronic device 106, the electronic device 306, the electronic device 308, and the electronic device 310. To obtain the device-specific public keys for each device, the first device may query an identity server for the (e.g., item-independent) device-specific public keys. For instance, an identity server (e.g., server 108) may maintain a database of user accounts and the public keys of devices registered to the user accounts. In one or more implementations, if the number of the device-specific public keys is less than a predetermined number, placeholder keys may be generated so that there is a predetermined number of keys. In one or more implementations, the device-specific keys may also be service-specific keys, e.g., keys specific to both the particular devices and the particular collaborative application/service.

After the device-specific public keys are obtained, the item-specific public keys (e.g., public keys 309-315) may be generated based on a (e.g., item-independent) device-specific public key and an item identifier. The item identifier may include any information associated with the item suitable for key generation. Generating an item-specific public key may include processing a device-specific key such that the output is unique to the item and the device-specific key may be derivable from the output and the item. Such processing includes, but is not limited to, key diversification.

At block 704, a data structure representing the one or more devices associated with another user account may be generated. A data structure may be generated for each device or user account to be invited to access the item. The data structure (e.g., the data structure 400) may be any data structure that can derive a single identifier from one or more identifiers, such as a hash tree, a Merkle tree, an accumulator, or generally any data structure that combines keys into a form such that: (1) the number of keys in the data structure is indeterminable, and (2) the keys in the data structure cannot be iterated through, but existence of a public key in the data structure can be cryptographically proven without knowledge of (1) or (2). The leaf nodes of the data structure may contain the device-specific public keys, item-specific public keys, placeholder keys, or hashes generated therefrom. In one or more implementations, each data structure has a fixed number of leaf nodes.

Generating the data structure may include, for each pair of nodes at each level n, generating a corresponding parent node at each level n−1 until a level is 0. Level 0 of the data structure may be the level where only a single node remains (e.g., the root node 432). Generating a parent node may include deriving a hash from the corresponding child nodes. Deriving a hash from the corresponding child nodes may include hashing the key contained at or corresponding to each leaf node and/or concatenating the hashes of the corresponding child nodes to create a single hash.

At block 706, the cryptographic identifier of the data structure is provided to a server (e.g., the server 108) for association with the item, and/or an identifier thereof. The cryptographic identifier of the data structure may be a hash corresponding to the root node (e.g., the root node 432) of a data structure (e.g., the data structure 400), or a hash of the data structure itself. In one or more implementations, the cryptographic identifier may also or instead include one or more item-specific public keys and/or one or more hashes generated from one or more item-specific public keys.

The cryptographic identifier may be provided to the server by transmitting the cryptographic identifier directly or indirectly to the server. After receiving the cryptographic identifier, the server may associate the cryptographic identifier with the item corresponding to the invitation. Associating the cryptographic identifier may include adding the cryptographic identifier to a list of cryptographic identifiers corresponding to entities (e.g., users, user accounts, devices, etc.) authorized to access the item. In one or more implementations, the cryptographic identifier may be provided to an application through which the item will be accessed.

In one or more implementations, in addition or alternatively to providing the identifier of the data structure to the server, the entirety of the data structure may be provided to the server (e.g., when the data structure contains anonymous data and/or data that cannot be attributed to any particular user), and/or one or more public keys of the first device may be provided to the server. In the instance that one or more public keys of the first device are provided to the server, the first device may subsequently sign requests from one or more other devices using the corresponding private keys such that the server can verify the legitimacy of the requests from the other devices using the one or more public keys of the first device.

At block 708, an invitation for another user to access the item may be generated. The item may include a document (e.g., an image file, a text file, a video file, and the like). The invitation to access the item may include an invitation for another user to collaboratively edit the document with the first user. The invitation may include a hyperlink, network identifier, or any other information that directs the other user to the item. The invitation may also include at least a portion of the data structure (or the entirety of the data structure) corresponding to the other user generated at block 704. In one or more implementations, the invitation includes the cryptographic identifier and the leaf nodes (e.g., device-specific public keys, item-specific public keys, hashes, and/or placeholder keys) of the data structure.

At block 710, the invitation may be provided to the one or more of the devices associated with the other user. The invitation provides each of the other user's devices with access to the item via the server (e.g., the server 108), where the access to the item is based on the other user's devices generating a proof of authorization from the received at least the portion of the data structure of the other user and a key (e.g., the device-specific key or the item-specific key) of the respective recipient device.

Figure 8:
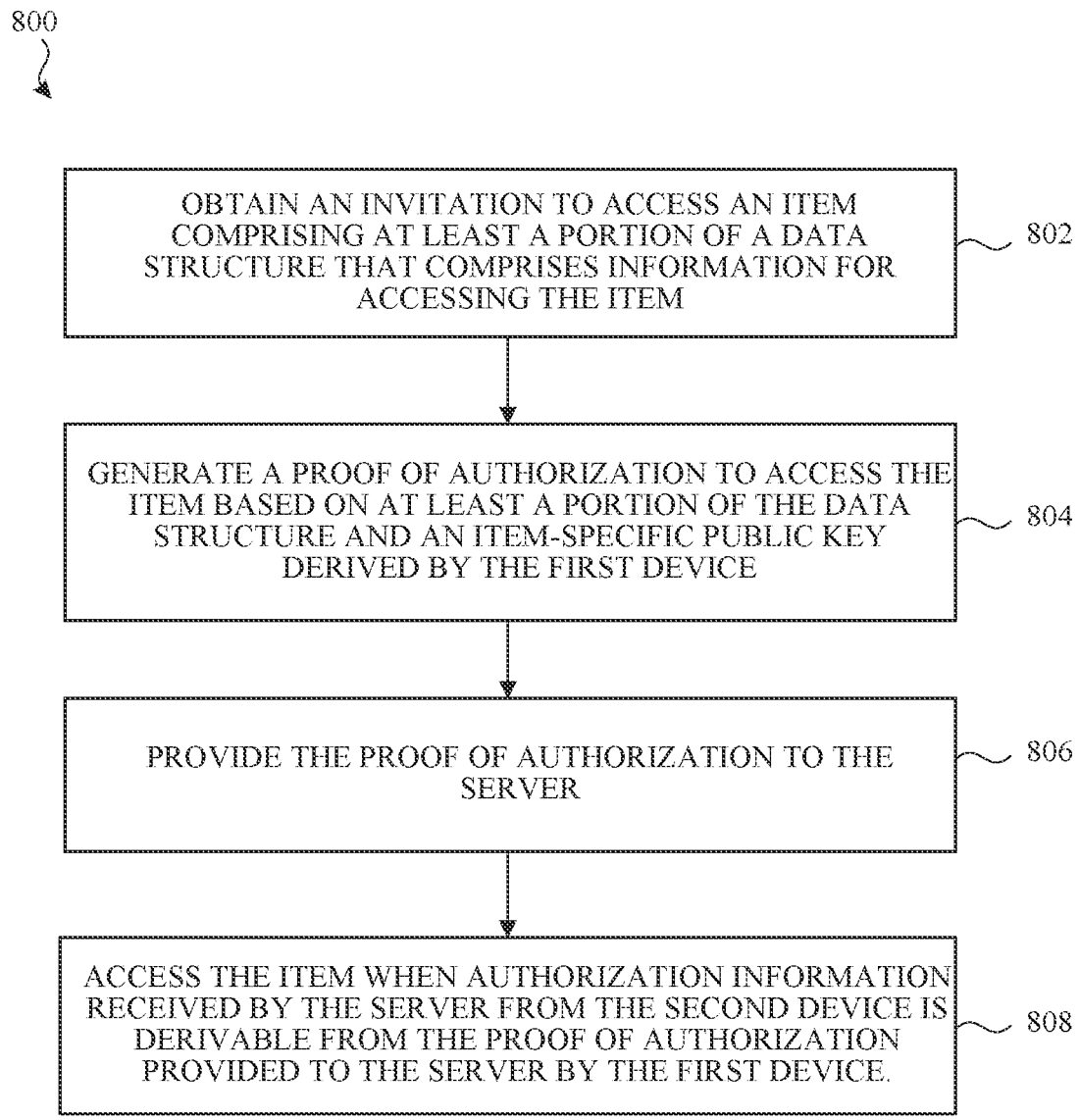
FIG. 8 depicts a flow diagram of an example process for accepting an invitation to participate in a group communication session, in accordance with one or more implementations.

FIG. 8 depicts a flow diagram of a process 800 for accepting an invitation for participating in a group communication session, in accordance with one or more implementations. For explanatory purposes, the process 800 is primarily described herein with reference to the electronic device 102, the electronic device 104, the electronic device 106, and the server 108 of FIG. 1. However, the process 800 is not limited to the electronic device 102, the electronic device 104, the electronic device 106, and/or the server 108, and one or more blocks of the process 800 may be performed by one or more other components of the electronic device 104, and/or by other suitable devices. Further, for explanatory purposes, the blocks of the process 800 are described herein as occurring sequentially or linearly. However, multiple blocks of the process 800 may occur in parallel. In addition, the blocks of the process 800 need not be performed in the order shown and/or one or more blocks of the process 800 need not be performed and/or can be replaced by other operations. It should be understood that components of a tree data structure (e.g., the data structure 400) may be referred to using tree data structure component terms (e.g., node, leaf node, or root node) and/or by their contents (e.g., public key or hash). In one or more implementations, an application performs stored on a first device performs the process 800 by calling APIs provided by the operating system of the first device. In one or more implementations, the operating system of the first device performs the process 800 by processing API calls provided by the application stored on the first device. In one or more implementations, the application stored on the first device fully performs the process 800 without making any API calls to the operating system of the first device.

At block 802, an invitation to access an item may be obtained by a first device (e.g., the electronic device 106) associated with a first user account (e.g., the second association 300B). The invitation may include at least a portion of a data structure (e.g., the data structure 400) that comprises information for accessing the item. The item may include a document, and the invitation may be for the first user account to collaboratively edit the document with the second user account.

The invitation may be received from a second device (e.g., the electronic device 102) associated with a second user account. In one or more embodiments, the invitation may be sent to the first device directly or indirectly. For example, the invitation may be transmitted to the first device directly via Bluetooth. As another example, the invitation may be relayed to the first device through an intermediary server (e.g., the server 108) that can perform operations on the invitation (e.g., security and/or integrity checks). The invitation may also or instead be accessed by the first device from a repository, a removable storage device, or any other device capable of storing invitations.

At block 804, a proof of authorization (e.g., the proof of authorization 500) to access the item may be generated. The proof of authorization allows for the root node of the data structure to be derived with only a portion of the data structure and a key (device-specific public key or item-specific public key) of the first device, such as by a device having the cryptographic identifier of a user. The proof of authorization may be generated based on at least a portion of the data structure (e.g., the data structure 400) and a key (e.g., a device-specific public key or an item-specific public key) of the first device (e.g., the electronic device 106).

For example, the first device may generate a proof of authorization by first generating a data structure using the item-specific public key of the first device. The item-specific public key of the first device may be based on a device-specific public key of the first device and an item identifier corresponding to the item. For each pair of nodes at each level n of the data structure, the first device may generate a corresponding parent node at each level n−1 until the root node is reached (e.g., level 0). Generating a corresponding parent node may include deriving a hash from the corresponding child nodes. From the data structure, the proof of authorization may be generated by selecting each node that is a child of the root node and is not an ancestor of the leaf node associated with the first device, as well as the public key associated with the first device, and a sibling node of the leaf node associated with the first device.

At block 806, the proof of authorization may be provided to the server (e.g., the server 108). The server may be any device that maintains access to the item. The first device may provide the proof of authorization to the server directly or indirectly via any data transportation medium, such as via a network. In one or more implementations, the proof of authorization may also include a signature generated using a private key of the first device before the proof of authorization is provided to the server.

At block 808, the item may be accessed by the first device after the server verifies the proof of authorization. Verifying the proof of authorization may include determining that authorization information received by the server from the second device (e.g., the device that generated the invitation) is derivable from the proof of authorization provided to the server by the first device.

For example, the second device may provide the server one or more cryptographic identifiers from the root node of one or more data structures to maintain a list of cryptographic identifiers that correspond to users that are authorized to access the item. The server may use the proof of authorization to reconstruct the root node of the data structure corresponding to the first device. The server may then determine whether the list of cryptographic identifiers includes the reconstructed cryptographic identifier and allow the first device to access the item in response to determining that the list of cryptographic identifiers includes the reconstructed cryptographic identifier.

Figure 9:
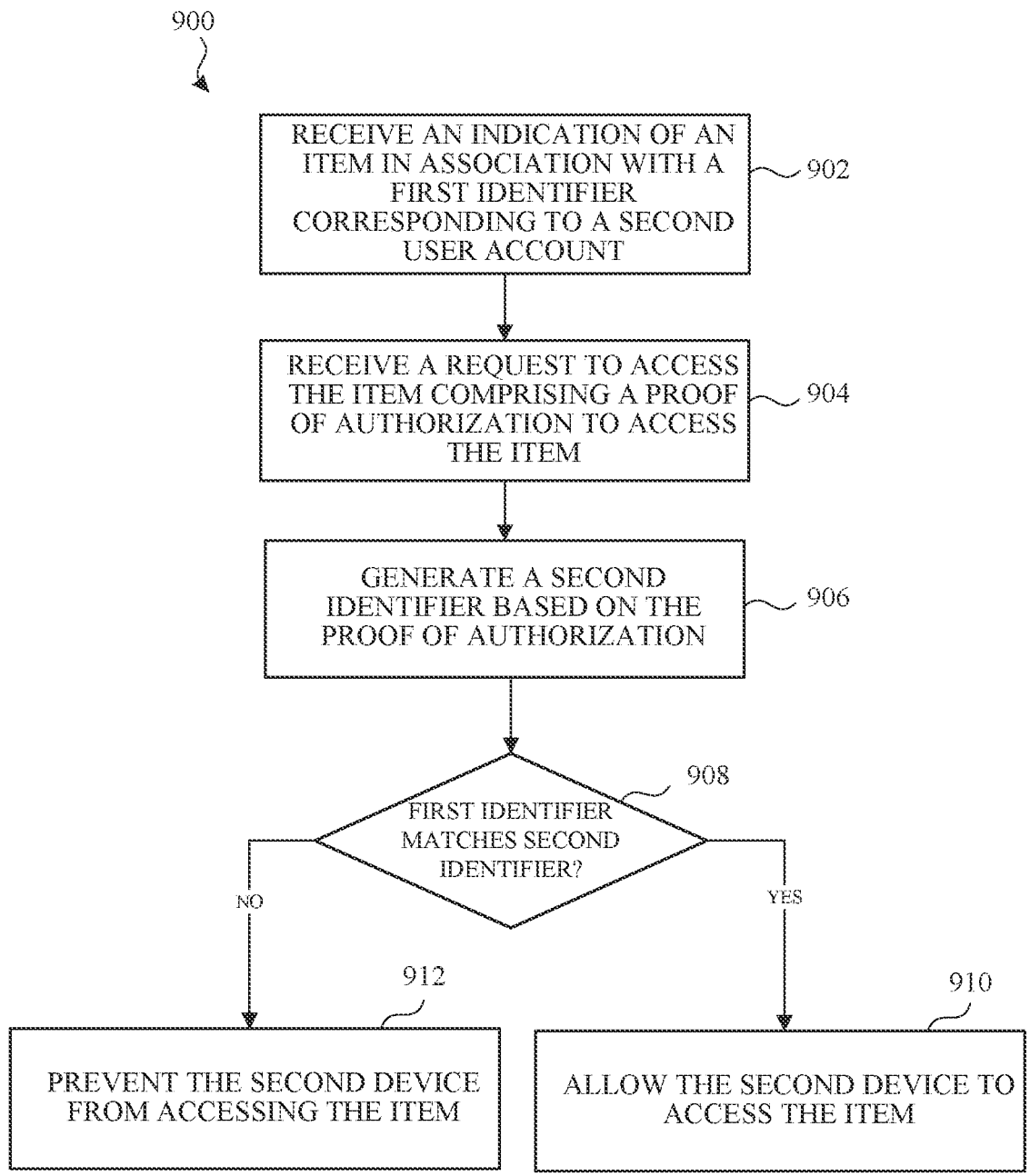
FIG. 9 depicts a flow diagram of an example process for granting access to a group communication session, in accordance with one or more implementations.

FIG. 9 depicts a flow diagram of a process 900 for granting access to a group communication session, in accordance with one or more implementations. For explanatory purposes, the process 900 is primarily described herein with reference to the electronic device 102, the electronic device 104, the electronic device 106, and the server 108 of FIG. 1. However, the process 900 is not limited to the electronic device 102, the electronic device 104, the electronic device 106, and/or the server 108, and one or more blocks of the process 900 may be performed by one or more other components of the server 108, and/or by other suitable devices. Further, for explanatory purposes, the blocks of the process 900 are described herein as occurring sequentially or linearly. However, multiple blocks of the process 900 may occur in parallel. In addition, the blocks of the process 900 need not be performed in the order shown and/or one or more blocks of the process 900 need not be performed and/or can be replaced by other operations. It should be understood that components of a tree data structure (e.g., the data structure 400) may be referred to using tree data structure component terms (e.g., node, leaf node, or root node) and/or by their contents (e.g., public key or hash). In one or more implementations, an application performs stored on a server performs the process 900 by calling APIs provided by the operating system of the server. In one or more implementations, the operating system of the server performs the process 900 by processing API calls provided by the application stored on the server. In one or more implementations, the application stored on the server fully performs the process 900 without making any API calls to the operating system of the server.

At block 902, an indication of an item in association with a first cryptographic identifier may be received by a server (e.g., the server 108) from a first device (e.g., the electronic device 102) associated with a first user account. The indication of the item may be a hyperlink, network identifier, item identifier, or any other kind of locator for the item, where the item may include a document or any other kind of electronic file. The item may have a corresponding list of cryptographic identifiers that correspond to users that are authorized to access the item. Each cryptographic identifier in the list of cryptographic identifiers may be and/or may correspond to a root node of a hash tree. The list of cryptographic identifiers may include a first cryptographic identifier corresponding to a second user account, and thus the indication of the item may be associated with the first cryptographic identifier.

The first cryptographic identifier may be based on a tree data structure (e.g., data structure 400) representing one or more devices (e.g., the electronic device 106, the electronic device 306, the electronic device 308, and the electronic device 310) associated with the second user account (e.g., the second association 300B), the tree data structure including a root node (e.g., root node 432) associated with a hash representing the first cryptographic identifier and leaf nodes associated with hashes (e.g., of device-specific public keys or item-specific public keys) of the one or more devices associated with the second user account. In one or more implementations, the device-specific public keys may be item-specific public keys where each respective item-specific public key of each respective device associated with the second user account is based on a respective (e.g., item-independent) device-specific public key of the respective device associated with the second user account and an item identifier corresponding to the item.

At block 904, the server may receive a request to access the item. The request to access the item may be from a second device (e.g., the electronic device 310) associated with the second user account (e.g., the second association 300B) and may include a proof of authorization (e.g., the proof of authorization 500) to access the item. The second device may provide the proof of authorization to the server directly or indirectly via any data transportation medium, such as a network.

In one or more implementations, the proof of authorization may include a signature for verifying the integrity of the proof of authorization. For example, the server may use the public key of the second device (e.g., which may be accessed from the proof of authorization or from another source such as a server) to derive a hash of the data of the proof of authorization from the signature, generate a hash of the data of the proof of authorization, and compare the derived hash and the generated hash to ensure they match.

At block 906, a second cryptographic identifier may be generated. The second cryptographic identifier may be generated based on the proof of authorization by the server. The proof of authorization may be based on a tree data structure and may include each node that is a child of the root node and is not an ancestor of a leaf node associated with the second device (e.g., the node 430), the public key associated with the second device (e.g., the public key 315), and the sibling node of the leaf node associated with the second device (e.g., the node 411).

Generating the second cryptographic identifier may include recreating at least a portion of a tree data structure based on the proof of authorization. Recreating the tree data structure may include deriving the ancestor (e.g., the node 428) of the leaf node associated with the second device based on the leaf node associated with the second device as well as the sibling node of the leaf node associated with the second device. Generating the second cryptographic identifier may also include deriving the root node (e.g., the root node 432) based on the nodes that are children of the root node (e.g., the node 428 and the node 430). Generating the second cryptographic identifier may further include accessing the second cryptographic identifier at a root node of the recreated portion of the tree data structure.

At block 908, the server may determine whether the first cryptographic identifier matches the second cryptographic identifier. Determining whether the first cryptographic identifier matches the second cryptographic identifier may include comparing the first cryptographic identifier and the second cryptographic identifier to determine whether they match. Determining whether the first cryptographic identifier matches the second cryptographic identifier may also or instead include determining whether the second cryptographic identifier can be found in a list of cryptographic identifiers that are authorized to access the item, which includes the first cryptographic identifier. If the first cryptographic identifier matches the second cryptographic identifier, the process 900 may proceed to block 910 where the second device may be allowed to access the item; otherwise, the process 900 may proceed to block 912 where the second device is prevented from accessing the item.

As described above, one aspect of the present technology is the gathering and use of data available from specific and legitimate sources for file sharing. The present disclosure contemplates that in some instances, this gathered data may include personal information data that uniquely identifies or can be used to identify a specific person. Such personal information data can include demographic data, location-based data, online identifiers, telephone numbers, email addresses, home addresses, images, videos, audio data, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for file sharing. Accordingly, the use of such personal information data may facilitate transactions (e.g., online transactions). Further, other uses for personal information data that benefit the user are also contemplated by the present disclosure. For instance, health and fitness data may be used, in accordance with the user's preferences to provide insights into their general wellness or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of file sharing, the present technology can be configured to allow users to select to "opt-in" or "opt-out" of participation in the collection of personal information data during registration for services or anytime thereafter. In addition to providing "opt-in" and "opt-out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed implementations, the present disclosure also contemplates that the various implementations can also be implemented without the need for accessing such personal information data. That is, the various implementations of the present technology are not rendered inoperable due to the lack of all or a portion of such personal information data.

Figure 10:
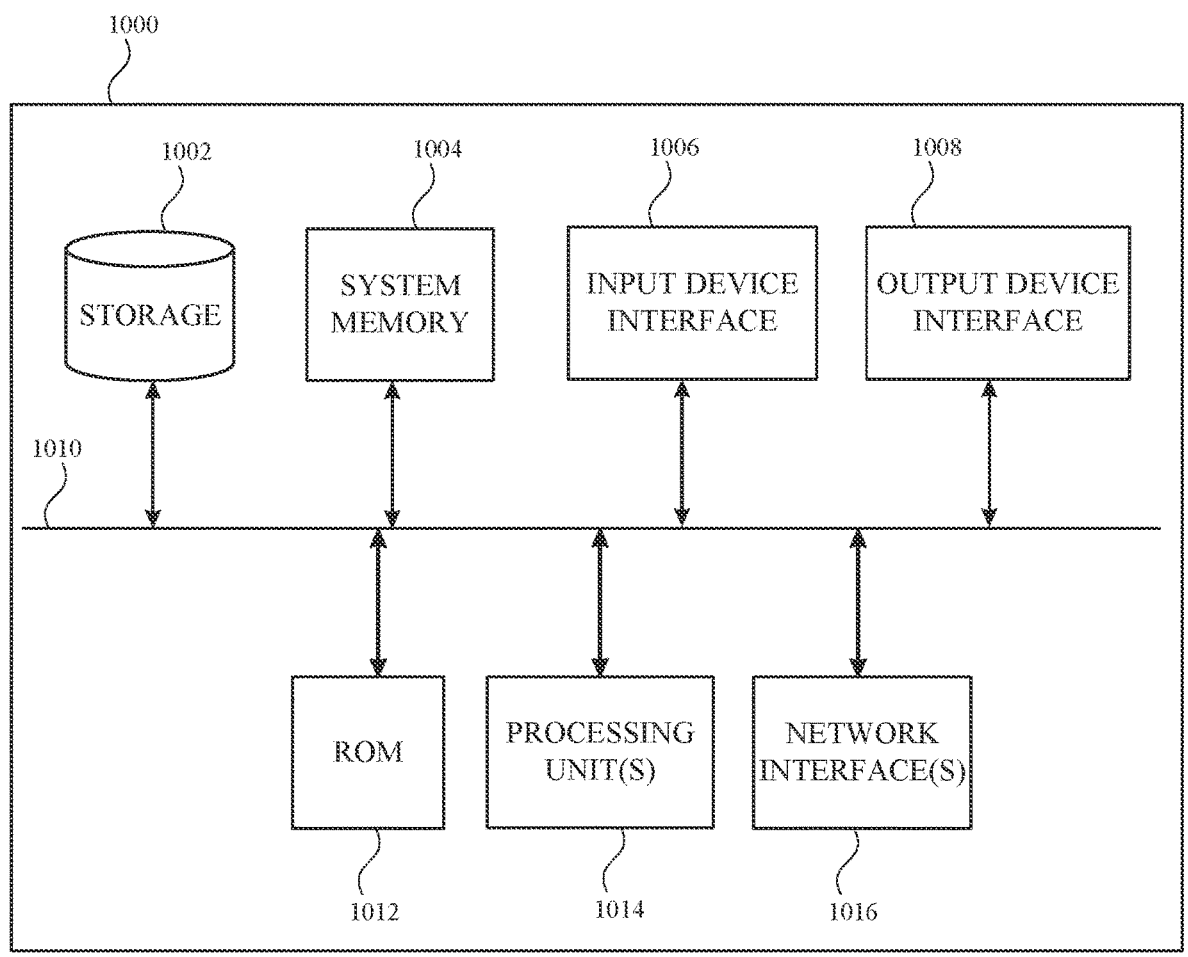
FIG. 10 depicts an example electronic system with which aspects of the present disclosure may be implemented, in accordance with one or more implementations.

FIG. 10 depicts an example electronic system 1000 with which aspects of the present disclosure may be implemented, in accordance with one or more implementations. The electronic system 1000 can be, and/or can be a part of, any electronic device for generating the features and processes described in reference to FIGS. 1-9, including but not limited to a laptop computer, tablet computer, smartphone, and wearable device (e.g., smartwatch, fitness band). The electronic system 1000 may include various types of computer-readable media and interfaces for various other types of computer-readable media. The electronic system 1000 includes one or more processing unit(s) 1014, a persistent storage device 1002, a system memory 1004 (and/or buffer), an input device interface 1006, an output device interface 1008, a bus 1010, a ROM 1012, one or more processing unit(s) 1014, one or more network interface(s) 1016, and/or subsets and variations thereof.

The bus 1010 collectively represents all system, peripheral, and chipset buses that communicatively connect the numerous internal devices of the electronic system 1000. In one or more implementations, the bus 1010 communicatively connects the one or more processing unit(s) 1014 with the ROM 1012, the system memory 1004, and the persistent storage device 1002. From these various memory units, the one or more processing unit(s) 1014 retrieves instructions to execute and data to process in order to execute the processes of the subject disclosure. The one or more processing unit(s) 1014 can be a single processor or a multi-core processor in different implementations.

The ROM 1012 stores static data and instructions that are needed by the one or more processing unit(s) 1014 and other modules of the electronic system 1000. The persistent storage device 1002, on the other hand, may be a read-and-write memory device. The persistent storage device 1002 may be a non-volatile memory unit that stores instructions and data even when the electronic system 1000 is off. In one or more implementations, a mass-storage device (such as a magnetic or optical disk and its corresponding disk drive) may be used as the persistent storage device 1002.

In one or more implementations, a removable storage device (such as a floppy disk, flash drive, and its corresponding disk drive) may be used as the persistent storage device 1002. Like the persistent storage device 1002, the system memory 1004 may be a read-and-write memory device. However, unlike the persistent storage device 1002, the system memory 1004 may be a volatile read-and-write memory, such as RAM. The system memory 1004 may store any of the instructions and data that one or more processing unit(s) 1014 may need at runtime. In one or more implementations, the processes of the subject disclosure are stored in the system memory 1004, the persistent storage device 1002, and/or the ROM 1012. From these various memory units, the one or more processing unit(s) 1014 retrieves instructions to execute and data to process in order to execute the processes of one or more implementations.

The bus 1010 also connects to the input device interfaces 1006 and output device interfaces 1008. The input device interface 1006 enables a user to communicate information and select commands to the electronic system 1000. Input devices that may be used with the input device interface 1006 may include, for example, alphanumeric keyboards, touch screens, and pointing devices (also called "cursor control devices"). The output device interface 1008 may enable, for example, the display of images generated by electronic system 1000. Output devices that may be used with the output device interface 1008 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1010 also couples the electronic system 1000 to one or more networks and/or to one or more network nodes through the one or more network interface(s) 1016. In this manner, the electronic system 1000 can be a part of a network of computers (such as a LAN, a wide area network ("WAN"), an Intranet, or a network of networks, such as the Internet). Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessors or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, one or more implementations, an embodiment, the embodiment, another embodiment, one or more implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
obtaining, by a first device associated with a first user account, one or more item-specific public keys of one or more devices associated with a second user account;
generating a data structure representing the one or more devices associated with the second user account based on the one or more item-specific public keys;
providing, to a server, an identifier of the data structure for association with the item;
generating an invitation for the second user account to access the item, the invitation comprising at least a portion of the data structure; and
providing the invitation to a second device of the one or more devices associated with the second user account to provide the second device with access to the item via the server, the access to the item being based on at least a portion of the data structure and a respective item-specific public key of the second device.

2. The method of claim 1, wherein obtaining the one or more item-specific public keys comprises:
obtaining device-specific public keys of the one or more devices associated with the second user account; and
generating the item-specific public key based on the device-specific public key and an item identifier corresponding to the item.

3. The method of claim 2, wherein obtaining the device-specific public keys of the one or more devices associated with the second user account comprises querying an identity server for the device-specific public keys of the one or more devices associated with the second user account.

4. The method of claim 1, wherein the identifier comprises a hash of the data structure.

5. The method of claim 4, wherein generating the data structure comprises, for each pair of nodes at each level n, generating a corresponding parent node at each level n−1 until a level is 0, and wherein generating a parent node comprises deriving a hash from corresponding child nodes.

6. The method of claim 5, further comprising generating placeholder keys such that the data structure has a predetermined number of leaf nodes, in response determining that a number of the leaf nodes is less than the predetermined number of leaf nodes.

7. The method of claim 1, wherein providing, to the server, the identifier of the data structure comprises at least one of providing the data structure to the server or providing one or more of the one or more item-specific public keys to the server.

8. The method of claim 1, wherein providing the identifier of the data structure for association with the item comprises transmitting the identifier to the server associated with the item for storage on a list associated with the item.

9. The method of claim 1, wherein the item comprises a document and the invitation to access the item comprises an invitation for the second user account to collaboratively edit the document with the first user account.

10. The method of claim 1, wherein providing the identifier of the data structure comprises providing the identifier to an application through which the item will be accessed.

11. A method comprising:
obtaining, by a first device associated with a first user account and from a second device associated with a second user account, an invitation to access an item via a server, the invitation comprising at least a portion of a data structure that comprises information for accessing the item;
generating, by the first device, a proof of authorization to access the item based on at least a portion of the data structure and an item-specific public key derived by the first device;
providing, by the first device, the proof of authorization to the server; and
accessing, by the first device, the item when authorization information received by the server from the second device is derivable from the proof of authorization provided to the server by the first device.

12. The method of claim 11, wherein the item-specific public key of the first device is based on a device-specific public key of the first device and an item identifier corresponding to the item.

13. The method of claim 11, wherein generating the proof of authorization comprises generating a tree data structure using the item-specific public key of the first device, wherein a root node of the tree data structure is associated with a hash representing an identifier of the tree data structure and each respective leaf node of the tree data structure is associated with a respective item-specific public key of a respective device of one or more devices associated with the first user account.

14. The method of claim 13, wherein generating the tree data structure comprises, for each pair of nodes at each level n, generating a corresponding parent node at each level n−1 until a level is 0, wherein the root node is a single node at level 0.

15. The method of claim 14, wherein generating a parent node comprises deriving a hash from corresponding child nodes.

16. The method of claim 13, wherein the proof of authorization comprises each node that is a child of the root node and is not an ancestor of a leaf node associated with the first device, the item-specific public key associated with the first device, and a sibling node of the leaf node associated with the first device.

17. The method of claim 13, wherein generating the proof of authorization further comprises signing the proof of authorization using a private key of the first device.

18. A method comprising:
receiving, by a server and from a first device associated with a first user account, an indication of an item in association with a first cryptographic identifier corresponding to a second user account;
receiving, by the server and from a second device associated with the second user account, a request to access the item, the request comprising a proof of authorization to access the item;
generating, by the server, a second cryptographic identifier based on the proof of authorization;
determining, by the server, whether the first cryptographic identifier matches the second cryptographic identifier; and
allowing, by the server, the second device to access the item, in response to determining that the first cryptographic identifier matches the second cryptographic identifier.

19. The method of claim 18, wherein generating the second cryptographic identifier comprises:
recreating at least a portion of a tree data structure based on the proof of authorization; and
accessing the second cryptographic identifier at a root node of the tree data structure.

20. The method of claim 19, wherein the proof of authorization is based on the tree data structure including each node that is a child of the root node and is not an ancestor of a leaf node associated with the second device, an item-specific public key associated with the second device, and a sibling node of the leaf node associated with the second device.

21. A method comprising:
obtaining, by a first device associated with a first user account, one or more public keys of one or more devices associated with a second user account;
generating a data structure representing the one or more devices associated with the second user account based on the one or more public keys;
generating an invitation for the second user account to access an item, the invitation comprising at least a portion of the data structure; and
providing the invitation to a second device of the one or more devices associated with the second user account to provide the second device with access to the item, the access to the item being based on at least a portion of the data structure and a respective public key of the second device.

* * * * *